United States Patent
Kitajima et al.

(10) Patent No.: US 10,350,527 B2
(45) Date of Patent: Jul. 16, 2019

(54) FILTER DEVICE AND FILTRATION DEVICE

(71) Applicant: YAMASHIN-FILTER CORP., Kanagawa (JP)

(72) Inventors: Nobuyuki Kitajima, Kanagawa (JP); Yoshinori Tsurusaki, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 0 days.

(21) Appl. No.: 15/803,958

(22) Filed: Nov. 6, 2017

(65) Prior Publication Data

US 2018/0147511 A1   May 31, 2018

(30) Foreign Application Priority Data

Nov. 29, 2016   (JP) .................................. 2016-230836

(51) Int. Cl.
| | |
|---|---|
| *B01D 36/00* | (2006.01) |
| *B01D 29/21* | (2006.01) |
| *B01D 29/33* | (2006.01) |
| *B01D 29/31* | (2006.01) |

(52) U.S. Cl.
CPC ........... *B01D 36/001* (2013.01); *B01D 29/21* (2013.01); *B01D 29/31* (2013.01); *B01D 29/33* (2013.01)

(58) Field of Classification Search
None
See application file for complete search history.

(56) References Cited

U.S. PATENT DOCUMENTS

| | | | | | |
|---|---|---|---|---|---|
| 3,288,289 | A | * | 11/1966 | Rosanen | B01D 35/027 210/90 |
| 4,133,763 | A | * | 1/1979 | Cooper | B01D 29/21 210/232 |
| 4,299,696 | A | * | 11/1981 | Rosaen | B01D 35/027 210/120 |
| 5,660,726 | A | * | 8/1997 | Dluzik | B01D 29/21 210/130 |
| 6,623,631 | B1 | * | 9/2003 | Graus | B01D 29/21 210/120 |
| 2009/0178977 | A1 | * | 7/2009 | Core | B01D 36/001 210/741 |
| 2015/0246304 | A1 | * | 9/2015 | Moessinger | B01D 35/0276 210/232 |
| 2016/0184746 | A1 | * | 6/2016 | Bautz | B01D 35/027 210/222 |
| 2018/0104629 | A1 | * | 4/2018 | Taku | F15B 1/26 |

FOREIGN PATENT DOCUMENTS

JP   2006-046142 A   2/2006

* cited by examiner

*Primary Examiner* — Benjamin M Kurtz
(74) *Attorney, Agent, or Firm* — Nakanishi IP Associates, LLC

(57) ABSTRACT

A filter device is provided with an impeding member that impedes a flow of a fluid in a hollow portion of a filter element or a hollow portion of an outflow portion that communicates the hollow portion of the filter element and an exterior of a filter case. Further, a lid member that covers an upper end of the filter case includes an external flow path that communicates the hollow portion of the filter element to the exterior of the filter case.

5 Claims, 9 Drawing Sheets

FILTER DEVICE AND FILTRATION DEVICE

TECHNICAL FIELD

The present invention relates to a filter device and a filtration device.

BACKGROUND ART

Patent Document 1 discloses a filter that is floatable on a liquid. This filter includes a filter case and, formed in the filter case, an air release hole provided with a float that moves up and down in accordance with a height of a liquid level inside an inflow space, and an air reservoir that contains air in a sealed state inside the inflow space when the float is blocking an opening of the air release hole. The liquid level lowers with an increase in the air accumulated in the air reservoir, thereby separating the float from the opening and allowing a portion of the air in the air reservoir to discharge via the air release hole.

The invention described in Patent Document 1 is configured to filter a fuel of a power machine, and prevent the occurrence of defects (engine knocking and engine stall, for example) caused by air contained in a fuel that passed through a filter.

CITATION LIST

Patent Literature

Patent Document 1: JP 2006-046142 A

In a power machine or the like, a fuel does not always pass through a filter at a constant flow rate. For example, when an engine is started, the flow rate of the fuel suddenly increases temporarily. Nevertheless, in the invention described in Patent Document 1, even when the flow rate of the fuel (liquid) is constant and air can be released from the air release hole, the air contained in the liquid may pass through the filter as is when a sudden increase in the liquid flow rate occurs. Then, the greater the amount of air passed through the filter, the greater the possibility of defect occurrence.

SUMMARY OF INVENTION

In light of the above, one or more embodiments of the present invention are directed to provide a filter device and a filtration device capable of reducing an amount of air that flows out with a liquid after filtration, even when a flow rate of the liquid suddenly increases.

A filter device according to one or more embodiment of the present invention includes, for example, a filter element including a filtration material having a substantially cylindrical shape, a filter case having a bottomed substantially cylindrical shape and provided with the filter element in an interior thereof, a lid member that covers an upper end of the filter case and includes an external flow path that communicates a hollow portion of the filter element and an exterior of the filter case, an inflow portion configured to cause a fluid to flow into a space between the filter case and the filter element, an outflow portion that has a substantially tubular shape, communicates the hollow portion of the filter element and the exterior of the filter case, and is provided on a lower side of the filter element, and an impeding member that impedes a flow of the fluid and is provided in a hollow portion of the filter element or the outflow portion.

According to the filter device of one or more embodiment of the present invention, the impeding member that impedes the flow of the fluid is provided in the hollow portion of the filter element or the hollow portion of the outflow portion that communicates the hollow portion of the filter element to the exterior of the filter case. As a result, even when the flow rate of the liquid suddenly increases, it is possible to prevent the filtered liquid from flowing outside the filter case all at once. Further, the lid member that covers the upper end of the filter case includes the external flow path that communicates the hollow portion of the filter element to the exterior of the filter case. As a result, the flow of the liquid is impeded, making it possible to discharge the air accumulated in the interior of the filter element outside the filter case via the external flow path. Thus, it is possible to reduce the amount of air that flows out with the filtered liquid.

Here, the lid member may further include a second external flow path that communicates the space between the filter case and the filter element to the exterior of the filter case. As a result, the air accumulated in the area between the filter case and the filter element can be discharged outside the filter case via the external flow path. In particular, when the flow rate increases, a hydraulic oil cannot pass through the filter element, and thus the hydraulic oil before filtration readily accumulates between the filter case and the filter element. Thus, air is removed from the hydraulic oil before filtration, making it possible to reduce the amount of air that flows out with the liquid after filtration even when a sudden increase in the flow rate of the liquid occurs.

Here, the external flow path may include a case portion provided with a hole main body portion having a substantially columnar shape, a first hole portion that is formed on an upper side of the hole main body portion and includes a portion having a cross-sectional area of a cross section substantially orthogonal to a first direction along a center axis of the hole main body portion that is less than a cross-sectional area of a cross section substantially orthogonal to the first direction of the hole main body portion, and a second hole portion that is formed on a lower side of the hole main body portion and has a cross-sectional area of a cross section substantially orthogonal to the first direction that is less than a cross-sectional area of a cross section substantially orthogonal to the first direction of the hole main body portion. With such an external flow path, the filter device further includes a float inserted into the case portion, formed from a material having a specific gravity less than that of the fluid, and provided so as to be movable between a position that blocks the first hole portion and a position that blocks the second hole portion. This makes it possible to discharge only air from the external flow path and not hydraulic oil.

Here, the impeding member may include a plurality of blade members having a substantially fan-type plate shape in a planar view. Such blade members are provided so as to form a spiral in a circumferential direction. This creates a vortex in the hydraulic oil, thereby facilitating the release of air.

A filtration device according to one or more embodiment of the present invention includes, for example, a filter device provided with a filter element that includes a filtration material having a substantially cylindrical shape, a filter case having a bottomed substantially cylindrical shape and provided with the filter element in an interior thereof, a lid member that covers an upper end of the filter case and includes an external flow path that communicates a hollow portion of the filter element to an exterior of the filter case, an inflow portion configured to cause a fluid to flow into a space between the filter case and the filter element, an outflow portion that has a substantially tubular shape, communicates the hollow portion of the filter element to the exterior of the filter case, and is provided on a lower side of the filter element, and an impeding member that impedes a flow of the fluid and is provided in a hollow portion of the filter element or the outflow portion; a tank provided with the filter device in an interior thereof; and a strainer provided near a bottom surface of the tank. The filter device and the strainer are provided in the interior of the tank with a lower side of the filter device in contact with an upper side of the strainer. Thus, it is possible to reduce the amount of air that flows out with the filtered liquid even when a sudden increase in the flow rate of the liquid occurs. Further, a size of the tank can be reduced.

According to one or more embodiment of the present invention, it is possible to reduce an amount of air that flows out with a liquid after filtration even when a sudden increase in a flow rate of a liquid occurs.

DESCRIPTION OF EMBODIMENTS

Embodiments of the present invention will be described in detail below with reference to the drawings. While the present invention is described below using a return filter as an example, the present invention can be applied to various filter devices other than the return filter. Further, while hydraulic oil is described as an example of a fluid, the present invention can be applied to various fluids other than hydraulic oil.

First Embodiment

Figure 1:
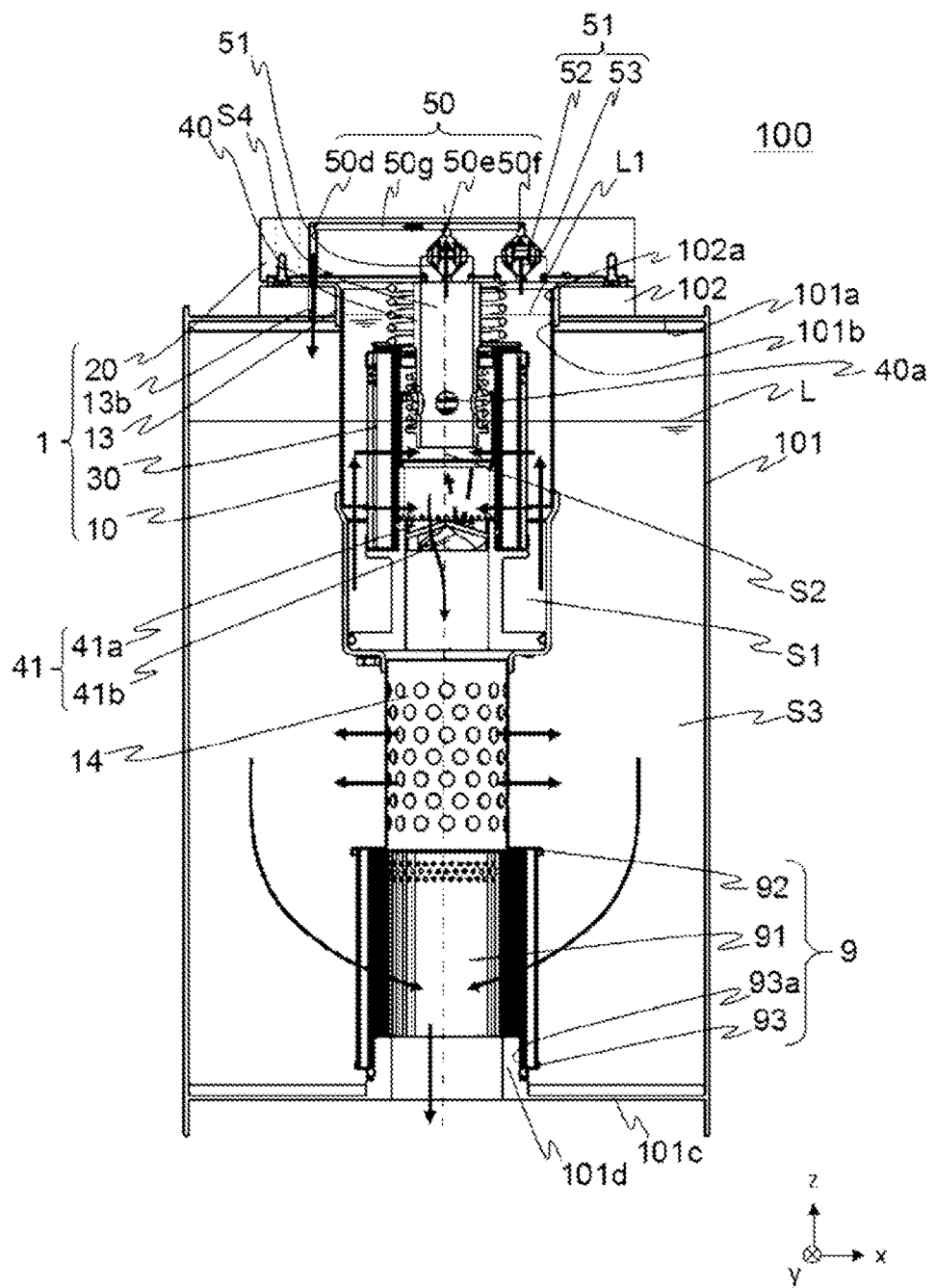
FIG. 1 is a diagram illustrating an overview of a hydraulic oil tank 100 provided with a return filter 1 in an interior thereof.

FIG. 1 is a diagram illustrating an overview of a hydraulic oil tank 100 provided with a return filter 1, according to an embodiment of the present invention, in an interior thereof. In FIG. 1, main parts of the hydraulic oil tank 100 are illustrated from a perspective cross-sectional view (note that hatching indicating a cross section is omitted).

The hydraulic oil tank 100 is installed in a work machine (a hydraulic apparatus, for example, not illustrated), and is a tank provided inside a hydraulic circuit of a hydraulic oil supplied to the hydraulic apparatus for storing the hydraulic oil. In the hydraulic circuit, the hydraulic oil passes through the hydraulic apparatus and is introduced into the hydraulic oil tank 100.

The hydraulic oil tank 100 includes a tank main body 101 having a box shape, for example, and this tank main body 101 has a hollow interior. The interior of the tank main body 101 is mainly provided with the return filter 1 and a suction strainer 9.

An inflow port (not illustrated) that is configured to allow the hydraulic oil to flow into the interior of the tank main body 101 is formed on a side surface of the tank main body 101. The hydraulic oil that entered via the inflow port is introduced into the return filter 1. The hydraulic oil is filtered by the return filter 1 and stored in the hydraulic oil tank 100.

A hole 101b into which the return filter 1 is inserted is formed on an upper surface 101a of the tank main body 101. An attachment plate 102 is provided to the upper surface 101a.

The attachment plate 102 is a member having a plate shape and fixed to an upper side of the upper surface 101a, and a hole 102a into which the return filter 1 is inserted is formed therein. A lid member 20 (described in detail later) of the return filter 1 is provided to an upper surface of the attachment plate 102.

Bolt insertion holes (not illustrated) are formed in peripheral edge portions of the lid member 20 and the attachment plate 102. Bolts are screwed into the bolt insertion holes, thereby fastening the lid member 20 (that is, the return filter 1) to the tank main body 101.

An outflow port 101d that allows the hydraulic oil inside the tank main body 101 to flow out to a hydraulic pump (not illustrated) is formed near a lower end portion of the tank main body 101 (on a lower surface 101c according to the present embodiment). The outflow port 101d is formed so as to protrude from the lower surface 101c to the interior of the tank main body 101.

To prevent foreign matter from entering the hydraulic pump, the suction strainer 9 is provided on an upper side of the outflow port 101d (in the interior of the tank main body 101, +z side). The hydraulic oil stored in the hydraulic oil tank 100 is suctioned into the hydraulic pump (not illustrated) via the suction strainer 9, and supplied once again to the hydraulic apparatus.

The suction strainer 9 mainly includes a filtration material 91, an upper end support member 92, and a lower end support member 93. The filtration material 91 is, for example, a plate-shaped member made of a metal with a plurality of holes formed therein, and is formed into a substantially cylindrical shape by communicating both ends so as to form a cylindrical shape. The upper end support member 92 is a plate-shaped member that covers an upper end of the filtration material 91, and the lower end support member 93 is a plate-shaped member that covers a lower end of the filtration material 91. A through-hole 93a is formed in a substantial center portion of the lower end support member 93. The outflow port 101d is fitted to the through-hole 93a, thereby positioning and fixing the suction strainer 9 to the tank main body 101.

The return filter 1 and the suction strainer 9 are provided in the interior of the tank main body 101 with a lower side of the return filter 1 in contact with an upper side of the suction strainer 9. Further, a center axis of the return filter 1, a center axis of the suction strainer 9, and a center axis of the outflow port 101d coincide. Thus, a size of the tank main body 101 can be reduced.

Figure 2:
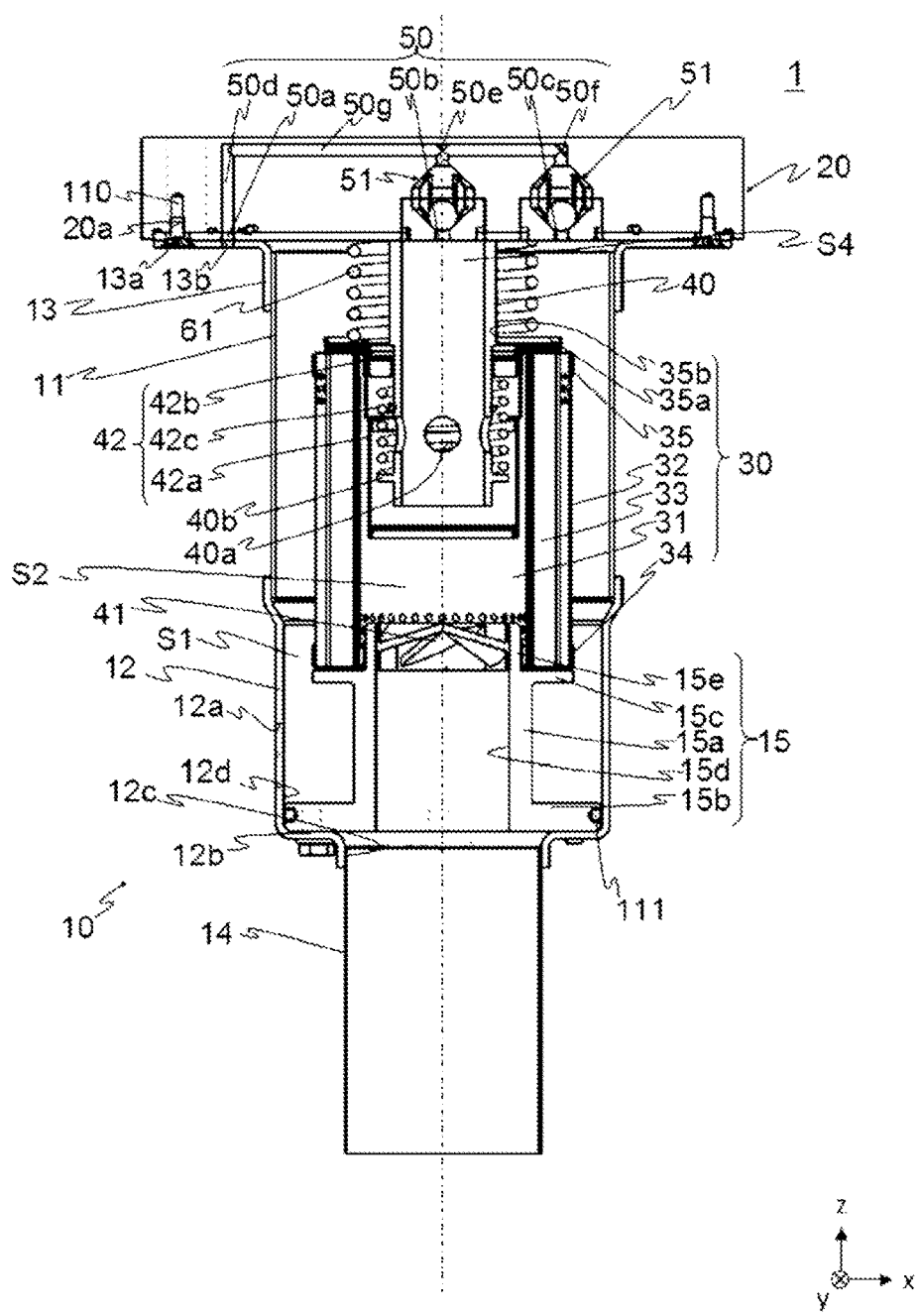
FIG. 2 is a cross-sectional view illustrating an overview of the return filter 1.

Next, the return filter 1 will be described. FIG. 2 is a cross-sectional view illustrating an overview of the return filter 1 (note that hatching indicating a cross section is omitted).

The return filter 1 mainly includes a filter case 10, the lid member 20, a filter element 30, a baffle plate 41, and an air release valve 51.

The filter case 10 is a member having an overall bottomed substantially cylindrical shape, and is formed from a metal. The filter case 10 mainly includes a first case 11 having a substantially cylindrical shape, and a second case 12 that has a bottomed substantially cylindrical shape and covers an opening on a bottom surface side (−z side) of the filter case 11.

A flange portion 13 is provided near an upper end of a side surface of the first case 11. Bolts 110 respectively inserted through bolt insertion holes 13a formed in the flange portion 13 are screwed into bolt holes 20a of the lid member 20, causing the first case 11, that is, the filter case 10 to be provided to the lid member 20.

An opening 12a provided with an inflow pipe (not illustrated) is formed in a side surface of the second case 12. The inflow pipe passes completely through the tank main body 101, communicating an interior of the second case 12 to an exterior of the tank main body 101. The hydraulic oil that entered from the inflow pipe is introduced into a space (hereinafter referred to as the "space S1") between the filter case 10 and the filter element 30.

An opening 12c is formed on a bottom surface 12b of the second case 12. A tubular portion 14 is provided to the opening 12c. The tubular portion 14 is a member having a substantially cylindrical shape, and is provided so as to protrude from the bottom surface 12b to a lower side (outer side of the second case 12, −z side). A plurality of holes are formed in the tubular portion 14 (refer to FIG. 1). Note that the tubular portion 14 is not required.

Further, an outflow pipe 15 is provided in the interior of the second case 12. The outflow pipe 15 includes a cylindrical portion 15a having a substantially cylindrical shape, a flange portion 15b formed on a lower end portion of the cylindrical portion 15a, and a flange portion 15c formed near an upper end of the cylindrical portion 15a. A through-hole 15d is formed in a substantial center of the outflow pipe 15.

A lower end surface of the flange portion 15b comes into contact with the bottom surface 12b of the second case 12, and an outer peripheral surface of the flange portion 15b comes into contact with the side surface 12d of the second case 12. A sealing member 111 is provided between the outer peripheral surface of the flange portion 15b and the side surface 12d so as to prevent leakage of the liquid inside the second case 12.

The filter element 30 is provided to the flange portion 15c. Further, a front end portion 15e that is a portion beyond the flange portion 15c of the outflow pipe 15 is inserted into a hollow portion of the filter element 30.

On the filter element 30, a downward (−z direction) force is biased by an elastic member 61. The elastic member 61 is a compression spring with a first end provided to the lid member 20, and a second end provided to the filter element 30. Thus, the filter element 30 is pressed against the flange portion 15c by the elastic member 61, and retained between the lid member 20 and the flange portion 15c.

The lid member 20 is a plate-shaped member that covers an upper end surface of the return filter 1 (first case 11). An external flow path 50 and the air release valve 51 that discharge air from an interior to an exterior of the filter element 30 are provided to the lid member 20. The external flow path 50 and the air release valve 51 will be described later.

The filter element 30 is a member that has an overall substantially cylindrical shape, and is provided in an interior of the filter case 10. The filter element 30 mainly includes an inner tube 31, an outer tube 32, a filtration material 33, and plates 34, 35.

The inner tube 31 and the outer tube 32 are members that have substantially hollow cylindrical shapes and include openings at both ends. The inner tube 31 and the outer tube 32 are formed using a material (a metal or a resin) having high corrosion resistance. A plurality of holes through which the hydraulic oil passes are formed across substantially the entire region of the inner tube 31 and the outer tube 32. Note that the outer tube 32 is not required.

The filtration material 33 is provided between the inner tube 31 and the outer tube 32. The filtration material 33 is configured to filter the hydraulic oil, and has a substantially cylindrical shape with a thickness in a radial direction. A height of the filtration material 33 is substantially the same as a height of the inner tube 31 and the outer tube 32. The filtration material 33 is formed by pleating a filter paper based on a synthetic resin, paper, or the like, and connecting both ends of the pleated filter paper to form a cylindrical shape.

The plate 34 is provided to first ends of the outer tube 32 and the inner tube 31, and the plate 35 is provided to second ends. The plate 34 and the plate 35 are members having a substantially circular plate shape or a bottomed substantially cylindrical shape, and are formed using a resin or a metal.

The plate 34 and the plate 35 are provided so as to cover the ends (openings) of the inner tube 31, the outer tube 32, and the filtration material 33. In other words, the plate 34 and the plate 35 sandwich the inner tube 31, the outer tube 32, and the filtration material 33.

The plate 34 covers the lower ends of the inner tube 31, the outer tube 32, and the filtration material 33. A lower end surface of the plate 34 comes into contact with the flange portion 15c. As a result, the hollow portion (hereinafter referred to as the "internal space S2") of the filter element 30, and a hollow portion of the outflow pipe 15 (space formed by the through-hole 15d) are in communication.

A sealing member (not illustrated) is provided to an inner peripheral surface of the plate 34. The sealing member is configured to prevent the hydraulic oil from entering the interior of the filter element 30 from the area between the plate 34 and the outflow pipe 15.

The front end portion 15e of the outflow pipe 15 is inserted into a hollow portion of the plate 34, that is, the hollow portion of the filter element 30. The baffle plate 41 serving as an impeding member that impedes the flow of the hydraulic oil is provided in an interior of the front end portion 15e. In other words, the baffle plate 41 is provided in the hollow portion of the filter element 30. The baffle plate 41 will be described in detail later.

The plate 35 covers the upper ends of the inner tube 31, the outer tube 32, and the filtration material 33. The plate 35 includes a plate-shaped portion 35a, and an opening 35b is formed in a substantial center of the plate-shaped portion 35a. A cylindrical member 40 is fitted to the opening 35b.

The cylindrical member 40 is a member having a substantially cylindrical shape, and is formed using a material (a metal or a resin) having high corrosion resistance. The cylindrical member 40 passes completely through the plate-shaped portion 35a, with a first end positioned in the internal space S2 and a second end in contact with the lid member 20. A plurality of holes 40a are formed in the region where the cylindrical member 40 is positioned in the internal space S2.

A valve 42 is provided to a lower side of the plate 35. The valve 42 opens and closes in accordance with a difference between a pressure of the space S1 and a pressure of the internal space S2. The valve 42 mainly includes a strainer 42a, a moving member 42b, and an elastic member 42c.

The strainer 42a is, for example, a plate-shaped member made of a metal with a plurality of holes formed substantially across the entire region, and is formed into a substantially cylindrical shape by communicating both ends so as to form a cylindrical shape. The moving member 42b is a plate-shaped member, and is capable of moving along an inner peripheral surface of the strainer 42a between a position of blocking an opening of the plate 35 and a position of opening the opening of the plate 35.

The elastic member 42c includes a first end provided to the moving member 42b, and a second end provided to the flange portion 40b of the cylindrical member 40. When the pressure on an outer side of the filter element 30 increases, the moving member 42b resists the biasing force of the elastic member 42c and is pressed downward (in the −z direction), opening the valve 42. When the pressure on the outer side of the filter element 30 decreases, the moving member 42b is pressed upward (in the +z direction) by the biasing force of the elastic member 42c, closing the valve 42.

Here, the external flow path 50 and the air release valve 51 formed in the lid member 20 will be described. The external flow path 50 is substantially U-shaped (substantially U-shaped in a lateral direction), and communicates the space S1, the internal space S2, and an exterior of the filter case 10 (hereinafter referred to as the "external space S3") (refer to FIG. 1).

The external flow path 50 includes three openings 50a, 50b, 50c. The opening 50a opens to the exterior of the filter case 10, and the openings 50b, 50c open to the interior of the filter case 10. The external flow path 50 further includes a first portion 50d provided with the opening 50a, a second portion 50e provided with the opening 50b, a third portion 50f provided with the opening 50c, and a linking portion 50g that links the first portion 50d, the second portion 50e, and the third portion 50f.

The opening 50b is disposed in a position that overlaps with a hollow portion of the cylindrical member 40 in a planar view (when viewed from the +z direction). The opening 50c is disposed between the cylindrical member 40 and the first case 11 in a planar view. Thus, the second portion 50e and the internal space S2 are in communication, and the third portion 50f and the space S1 are in communication.

Figure 3:
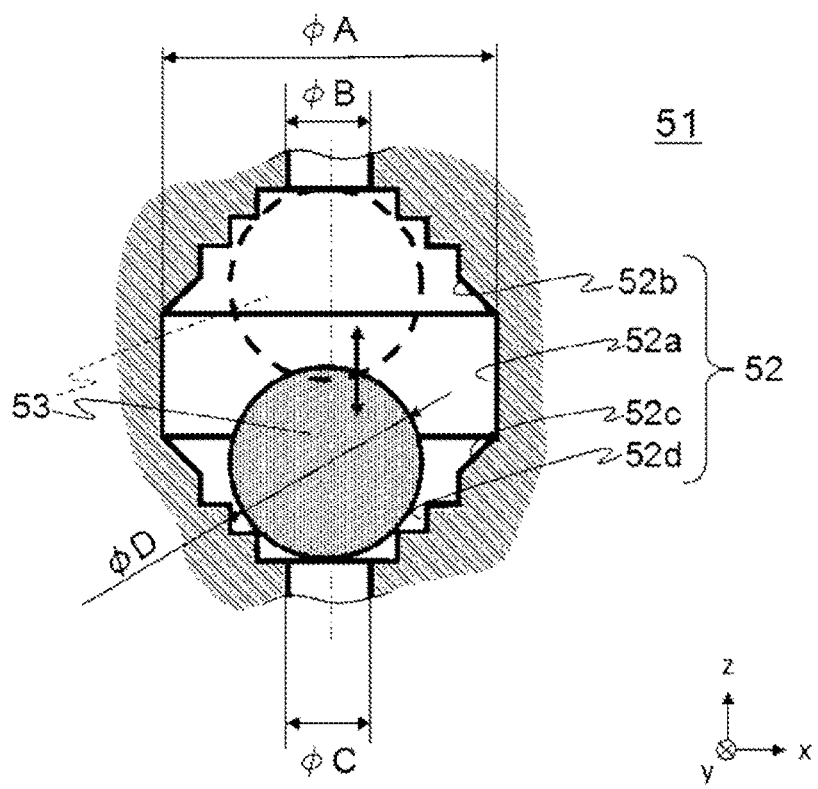
FIG. 3 is a cross-sectional view illustrating the details of an air release valve 51.

The air release valve 51 is formed in the second portion 50e as well as in the third portion 50f. FIG. 3 is a cross-sectional view illustrating the details of the air release valve 51. The air release valve 51 includes a case portion 52 and a float 53.

The case portion 52 includes a hole main body portion 52a, a first tapered hole portion 52b, and a second tapered hole portion 52c. The hole main body portion 52a is a hole having a substantially columnar shape, and a diameter of a cross section thereof substantially orthogonal to a longitudinal direction is $\phi A$. The first tapered hole portion 52b is formed on an upper side (+z side) of the hole main body portion 52a, and is formed so that a diameter thereof gradually decreases upward (in the +z direction). The second tapered hole portion 52c is formed on a lower side (−z side) of the hole main body portion 52a, and is formed so that a diameter thereof gradually decreases downward (in the −z direction).

The first tapered hole portion 52b and the second tapered hole portion 52c are holes having a substantially truncated cone shape overall. A plurality of grooves 52d for straining oil are formed on side surfaces of the first tapered hole portion 52b and the second tapered hole portion 52c. Note that the position and shape of the groove 52d are not limited to those illustrated.

Given $\phi B$ as the diameter of a narrowest portion of the first tapered hole portion 52b and $\phi C$ as the diameter of a narrowest portion of the second tapered hole portion 52c, $\phi A>\phi B$ and $\phi A>\phi C$. That is, the first tapered hole portion 52b and the second tapered hole portion 52c each include a portion having a cross-sectional area of a cross section substantially orthogonal to the z direction (direction along a center axis of the hole main body portion 52a) that is less than a cross-sectional area of a cross section of the hole main body portion 52a substantially orthogonal to the z direction.

Note that, in the present embodiment, while a taper angle of the first tapered hole portion 52b and a taper angle of the second tapered hole portion 52c are substantially the same and $\phi B=\phi C$, the taper angle of the first tapered hole portion 52b and the taper angle of the second tapered hole portion 52c may differ and $\phi B$ and $\phi C$ may differ.

The float 53 is inserted into an interior of the case portion 52 and, more specifically, into a space formed by the hole main body portion 52a, the first tapered hole portion 52b, and the second tapered hole portion 52c. The float 53 has a substantially spherical shape and, given $\phi D$ as the diameter thereof, $\phi A>\phi D$, $\phi D>\phi B$, and $\phi D>\phi C$. In other words, the diameter of the float 53 is less than the diameter of the hole main body portion 52a, and greater than the diameters of the narrowest portions of the first tapered hole portion 52b and the second tapered hole portion 52c.

Thus, the float 53 is movable in a vertical direction (z direction) between a position of contact with an upper end of the first tapered hole portion 52b (refer to the dashed line in FIG. 3) and a position of contact with a lower end of the second tapered hole portion 52c (refer to the solid line in FIG. 3).

The float 53 is formed from a material having a specific gravity less than that of the liquid (here, hydraulic oil) to be filtered. Thus, the float 53 floats on the hydraulic oil.

Next, the baffle plate 41 will be described. The baffle plate 41 has a substantially circular plate shape overall, and is provided so as to block the through-hole 15d along an inner peripheral surface of the front end portion 15e (side surface of the through-hole 15d). The baffle plate 41 is configured to impede the flow of the hydraulic oil that flows through the through-hole 15d.

Figure 4:
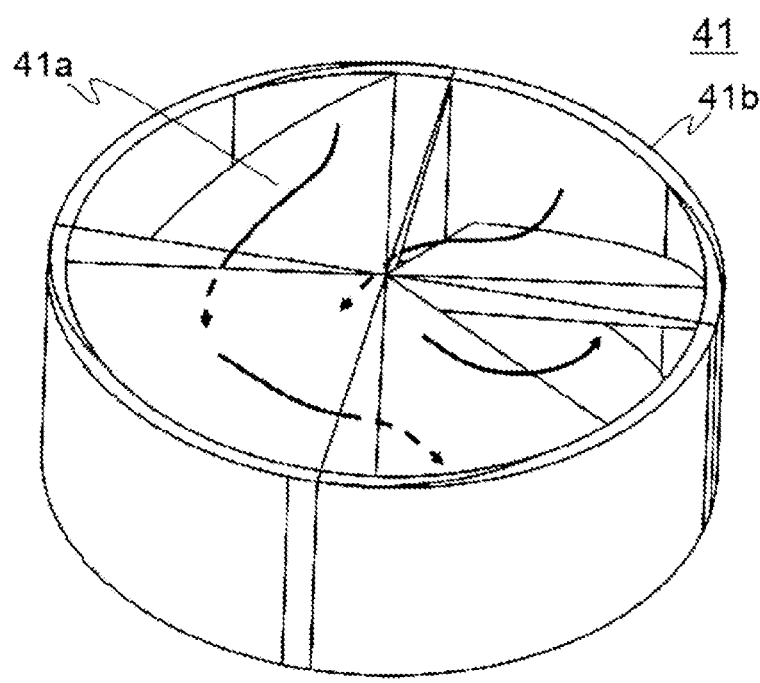
FIG. 4 is a perspective view illustrating the details of a baffle plate 41.
Figure 5:
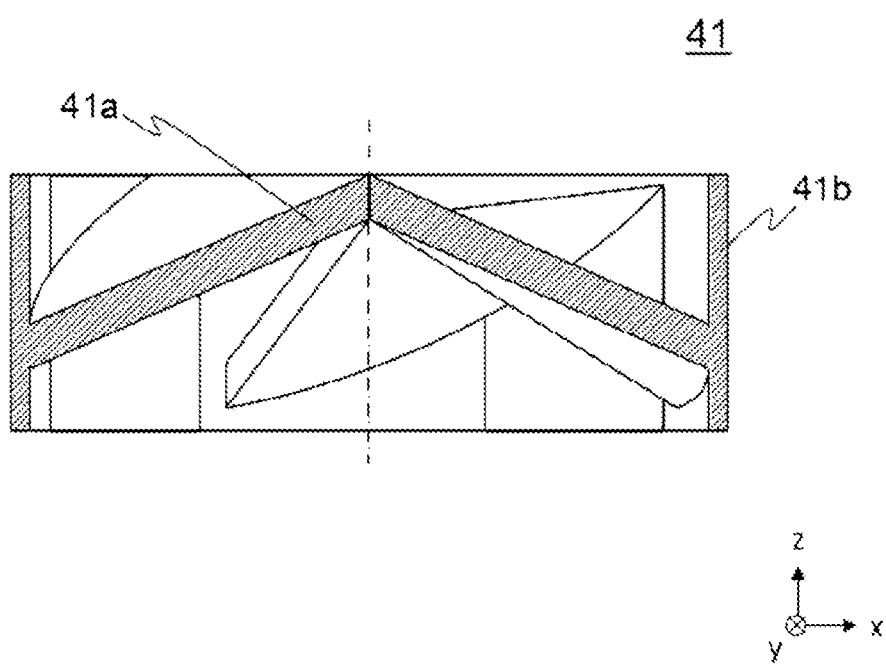
FIG. 5 is a cross-sectional view illustrating the details of the baffle plate 41.

FIG. 4 is a perspective view illustrating the details of the baffle plate 41, and FIG. 5 is a cross-sectional view illustrating the details of the baffle plate 41. The baffle plate 41 includes blade members 41a, which are substantially fan-like plate-shaped members in a planar view, and a peripheral wall 41b that has a substantially cylindrical shape and covers an outer peripheral portion of the blade member 41a. The outer peripheral surface of the peripheral wall 41b fits together with an inner peripheral surface of the through-hole 15d.

The blade members 41a are provided so as to form a spiral in the circumferential direction. The hydraulic oil comes into contact with the blade members 41a, and thus the flow of the hydraulic oil is impeded and a swirling current is produced in the hydraulic oil (refer to the arrows in FIG. 4).

Note that while the baffle plate 41 includes four blade members 41a in the present embodiment, the number of blade members need only be a plurality. Further, the shape of the blade member 41a is not limited to that illustrated.

Next, the function of the return filter 1 thus configured will be described using FIG. 1. The arrows in FIG. 1 indicate the flow of the hydraulic oil.

While the hydraulic apparatus is operating, the hydraulic oil flows inside the hydraulic circuit. The hydraulic oil flows through the inflow pipe (not illustrated) and the opening 12a (refer to FIG. 2) and into the space S1. The hydraulic oil flows from the outer side to an inner side of the filter element 30, and the filtered hydraulic oil flows to the internal space S2.

The air contained in the hydraulic oil flows into the internal space S2 along with the hydraulic oil. The air that flowed into the internal space S2 floats upward to an oil level L and disappears at the oil level L. A height of the oil level L is near the positions of the holes 40a, and the air that disappeared at the oil level L passes through the plurality of holes 40a and accumulates in an upper space (hereinafter referred to as the "space S4") of the cylindrical member 40.

Normally, the float 53 is in contact with the lower end of the second tapered hole portion 52c (refer to FIG. 3) under its own weight, blocking the external flow path 50. The air accumulated in the upper space of the cylindrical member 40 presses the float 53 of the air release valve 51 provided to the second portion 50e upward. As a result, an air passage is formed in the second portion 50e, and the air passes through the second portion 50e, the linking portion 50g, the first portion 50d, and a hole 13b (equivalent to the first external flow path), and is discharged outside the return filter 1 (refer to the arrows in FIG. 1). When the air is discharged, the float 53 returns to the position of blocking the second portion 50e.

The filtered hydraulic oil flows downward from the internal space S2. That is, the hydraulic oil passes between the blade members 41a, passes through the hollow portion of the outflow pipe 15 (the space formed by the through-hole 15d), and flows into the tubular portion 14. With the hydraulic oil passing between the blade members 41a, a vortex can be created in the hydraulic oil. As a result, air collects in the center of the vortex, and readily accumulates in the space S4.

The hydraulic oil that flowed into the tubular portion 14 flows from the plurality of holes formed in the tubular portion 14 into the external space S3. The hydraulic oil (in the interior of the tank main body 101) that flowed out to the external space S3 flows from the plurality of holes formed in the filtration material 91 to the interior of the suction strainer 9, through the outflow port 101d, and outside the tank main body 101.

When an operation such as the movement of an arm occurs in the hydraulic apparatus, the flow rate of the hydraulic oil that flows inside the hydraulic circuit suddenly increases temporarily. For example, while the flow rate of the hydraulic oil in a normal state is about 0.01 to 0.11/minute, the flow rate of the hydraulic oil becomes about 0.1 to 11/minute when suddenly increased. In the following, the flow of the hydraulic oil when the flow rate thereof is suddenly temporarily increased will be described.

Hydraulic oil of an amount greater than normal flows into the space S1. As a result, the hydraulic oil cannot pass through the filter element 30 and accumulates in the space S1. The oil level at this time is an oil level L1.

The hydraulic oil accumulated in the space S1 also contains air. This air floats upward to the oil level L1 and disappears at the oil level L1. The air that disappears at the oil level L1 accumulates in the space between the oil level L1 and the lid member 20. The float 53 of the air release valve 51 provided to the third portion 50f is pressed upward by this air. As a result, an air passage is formed in the third portion 50f, and the air passes through the third portion 50f, the linking portion 50g, the first portion 50d, and the hole 13b (equivalent to the second external flow path), and is discharged to the external space S3 (refer to the dashed lines and arrows in FIG. 1).

When the oil amount in the return filter 1 further increases, the interior of the return filter 1 may become filled with oil. With the float 53 floating on the oil surface, the float 53 is pressed upward by the hydraulic oil, rises with the rise of the oil surface, and comes into contact with the upper end of the first tapered hole portion 52b. The float 53 has a substantially spherical shape, and thus the float 53 and the first tapered hole portion 52b come into contact on an annular line. As a result, the float 53 blocks the upper end of the first tapered hole portion 52b, and the hydraulic oil does not flow to the exterior.

When the flow rate of the hydraulic oil is restored, the float 53 returns to the position of contact with the lower end of the second tapered hole portion 52c.

When the flow rate of the hydraulic oil that flows inside the hydraulic circuit increases, the flow rate of the filtered hydraulic oil that flows downward from the internal space S2 also increases. In this case, a portion of the hydraulic oil is bounced back at the blade members 41a and flows upward (refer to the dashed lines and arrows in FIG. 1). With the baffle plate 41 thus impeding the flow of the hydraulic oil, the flow rate into the tubular portion 14 (the flow rate from the tank main body 101) can be reduced. Thus, even when the flow rate of the hydraulic oil temporarily increases, the filtered hydraulic oil does not flow from the internal space S2 to the external space S3 all at once.

The flow rate into the tubular portion 14 decreases, causing the hydraulic oil to accumulate in the internal space S2. As a result, a greater amount of the air contained in the hydraulic oil accumulates in the space S4, the float 53 of the air release valve 51 provided to the second portion 50e is pressed upward, and the air passes through the second portion 50e, the linking portion 50g, the first portion 50d, and the hole 13b, and is discharged outside the return filter 1 (refer to the dashed lines and arrows in FIG. 1). Thus, the amount of air contained in the filtered hydraulic oil can be reduced.

According to the present embodiment, the baffle plate 41 impedes the flow of the hydraulic oil and thus, even when the flow rate of the hydraulic oil that flows inside the hydraulic circuit suddenly increases, the air contained in the hydraulic oil can be removed. As a result, the amount of air that flows from the return filter 1 along with the filtered hydraulic oil decreases, making it possible to prevent defects caused by air entry into a pump or the like.

Further, according to the present embodiment, the external flow path 50 communicates the space S1 and the external space S3 as well as the internal space S2 and the external space S3, making it possible to efficiently discharge the air removed from the hydraulic oil from the return filter 1.

Note that while the external flow path 50 includes the second portion 50e and the third portion 50f in the present embodiment, the third portion 50f is not required. However, to remove air more efficiently, inclusion of the third portion 50f is preferred. Further, while the air release valves 51 are formed in the second portion 50e and the third portion 50f in the present embodiment, the air release valves 51 are not required. In particular, the air release valve 51 provided to the second portion 50e is not required. The hydraulic oil in the internal space S2 is filtered hydraulic oil, and thus outflow to the external space S3 is unproblematic.

Further, while the baffle plate 41 is provided to the outflow pipe 15 in the present embodiment, the baffle plate 41 may be provided to the filter element 30. For example, the baffle plate 41 may be integrally formed near the lower end of the inner tube 31 without insertion of the front end portion 15e into the inner side of the inner tube 31.

Second Embodiment

While the baffle plate 41 was provided to the inner peripheral surface of the front end portion 15e in the first embodiment of the present invention, the position of the baffle plate 41 is not limited thereto as long as the baffle plate 41 blocks the through-hole 15d and impedes the flow of the hydraulic oil that flows through the through-hole 15d.

In a second embodiment of the present invention, the baffle plate 41 is provided near a bottom surface of the filter case 10. In the following, a return filter 2 according to the second embodiment will be described. Note that the difference between the return filter 1 and the return filter 2 is only the position of the baffle plate 41, and thus only the position of the baffle plate 41 of the return filter 2 will be described below, and all other descriptions will be omitted.

Figure 6:
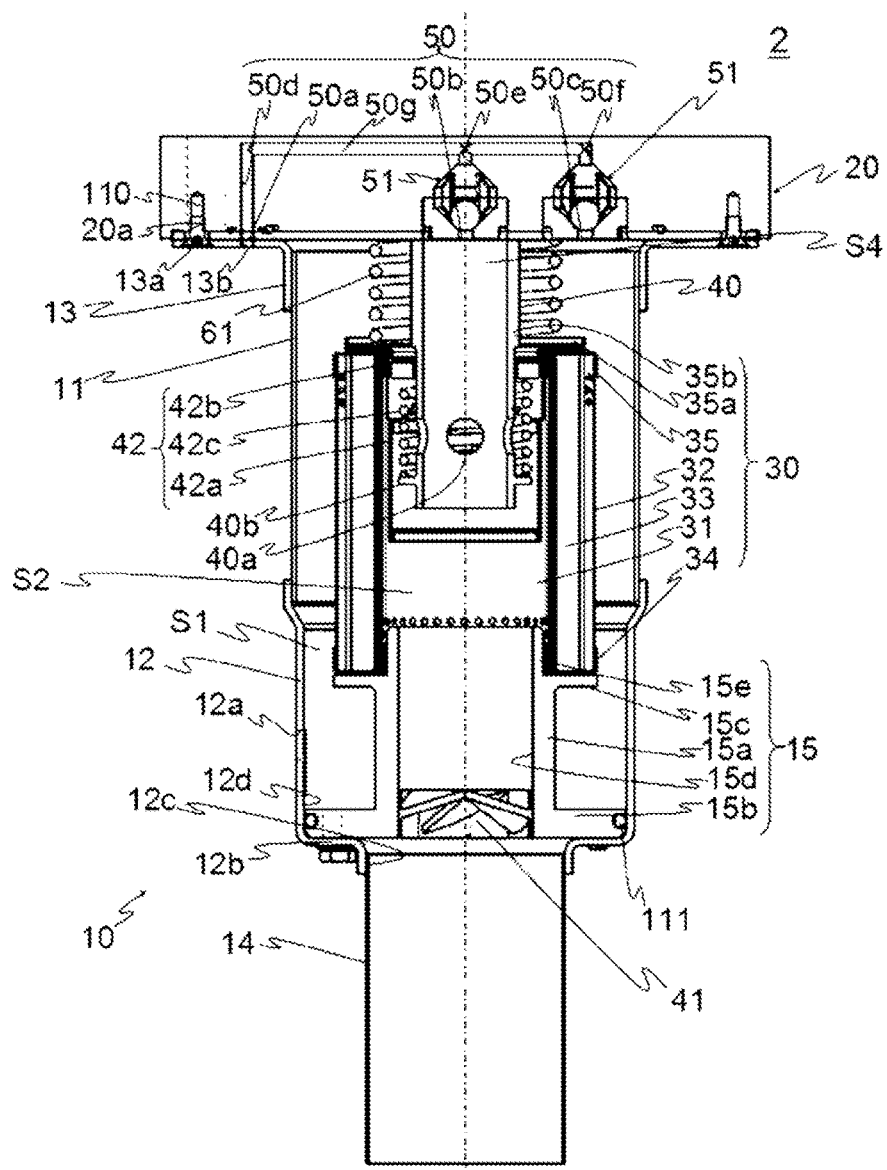
FIG. 6 is a cross-sectional view illustrating an overview of a return filter 2.

FIG. 6 is a cross-sectional view illustrating an overview of the return filter 2 (note that hatching indicating a cross section is omitted). The baffle plate 41 is provided so as to block the through-hole 15d along the inner peripheral surface of the through-hole 15d. The end surface on the lower side of the baffle plate 41 is substantially in the same position as the end surface on the lower side of the outflow pipe 15, that is, the position of bottom surface 12b.

A portion of the hydraulic oil that is to flow from the outflow pipe 15 is bounced back by the blade members 41a and flows upward, causing the filtered hydraulic oil to accumulate in the interior of the outflow pipe 15. Thus, it is possible to prevent the filtered hydraulic oil from flowing into the external space S3 all at once.

Note that while FIG. 6 illustrates an example in which the end surface on the lower side of the baffle plate 41 is substantially on the same surface as the bottom surface 12b, the baffle plate 41 need only be provided in the interior of the through-hole 15d. In other words, the baffle plate 41 need only be provided in the flow path of the hydraulic oil between the internal space S2 and the tank main body 101 so as to block the flow path.

Third Embodiment

While the first embodiment of the present invention used the baffle plate 41 provided on the inner side of the peripheral wall 41b and configured so that the plurality of blade members 41a formed a spiral in the circumferential direction, the form of the baffle plate is not limited thereto.

In a third embodiment of the present invention, a baffle plate having a plate shape is used. A return filter 3 according to the third embodiment will be described below. Note that the difference between the return filter 1 and the return filter 3 is only the baffle plate, and thus only the baffle plate of the return filter 3 will be described below, and all other descriptions will be omitted.

Figure 7:
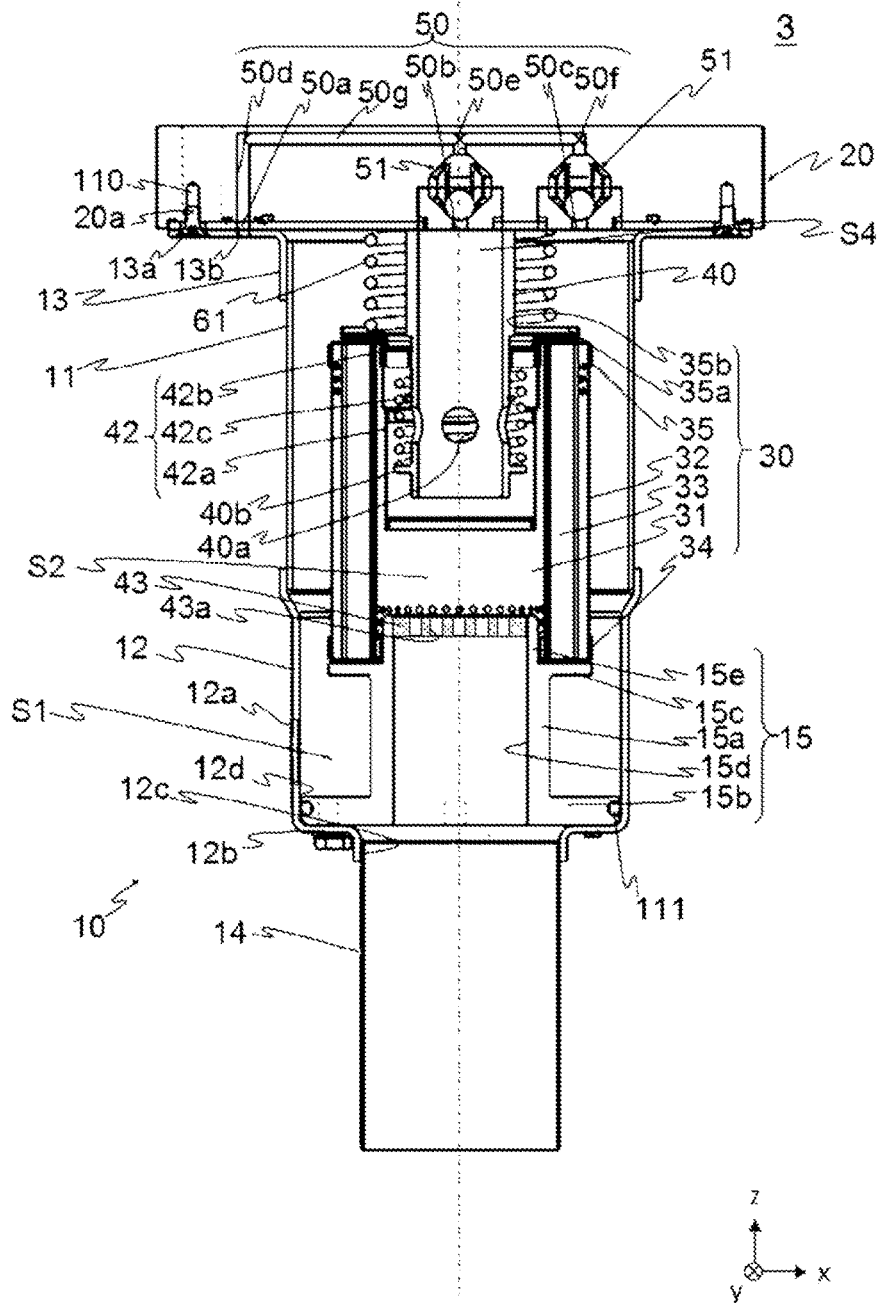
FIG. 7 is a cross-sectional view illustrating an overview of a return filter 3.

FIG. 7 is a cross-sectional view illustrating an overview of the return filter 3 (note that, other than in a baffle plate 43, hatching indicating a cross section is omitted). In the return filter 3, the baffle plate 43 is provided to the inner peripheral surface of the front end portion 15e.

The baffle plate 43 is a member having a substantially plate shape, and includes a plurality of holes 43a formed therein. When the filtered hydraulic oil flows downward from the inner side of the inner tube 31, the hydraulic oil is obstructed by the baffle plate 43. A portion of the filtered hydraulic oil flows through the holes 43a, from the tubular portion 14, and into the tank main body 101.

Note that while FIG. 7 illustrates an example in which the baffle plate 43 is substantially on the same surface as the end surface on the upper side of the outflow pipe 15, the baffle plate 43 need only be provided in the interior of the through-hole 15d.

Fourth Embodiment

While the first embodiment of the present invention used the baffle plate 41 as the impeding member that impedes the flow of the filtered hydraulic oil, the method of impeding the flow of the filtered hydraulic oil is not limited thereto.

In a fourth embodiment of the present invention, a check valve is used as the impeding member that impedes the flow of the hydraulic oil. A return filter 4 according to the fourth embodiment will be described below. Note that only the components of the return filter 4 that differ from those of the return filter 1 will be described, and descriptions of other components will be omitted.

Figure 8:
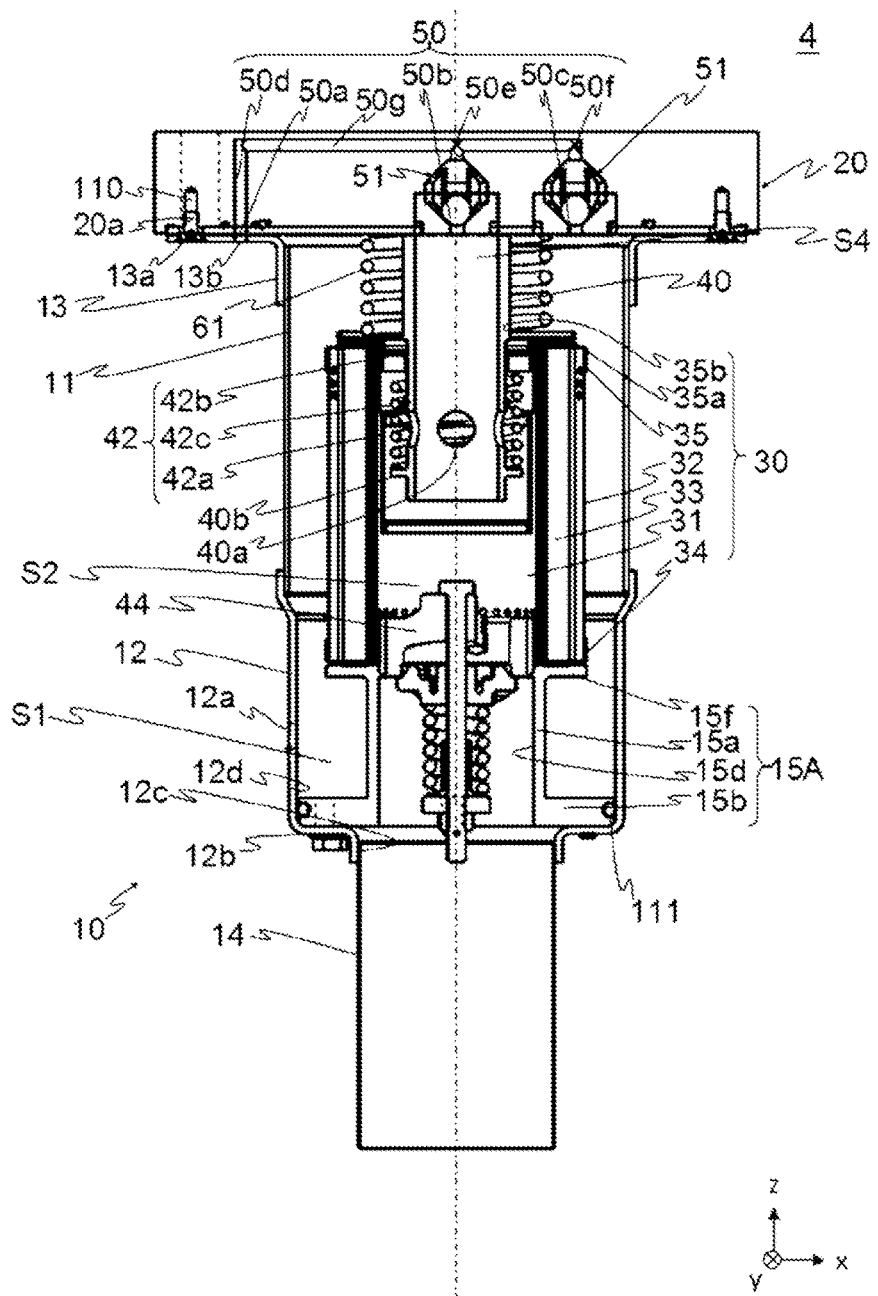
FIG. 8 is a cross-sectional view illustrating an overview of a return filter 4.

FIG. 8 is a cross-sectional view illustrating an overview of the return filter 4 (note that hatching indicating a cross section is omitted).

An outflow pipe 15A is provided in the interior of the second case 12. The outflow pipe 15A includes the cylindrical portion 15a having a substantially cylindrical shape, the flange portion 15b formed on the lower end portion of the cylindrical portion 15a, and a flange portion 15f formed on the upper end of the cylindrical portion 15a. The through-hole 15d is formed in a substantial center of the outflow pipe 15A.

The filter element 30 is provided to the flange portion 15f. Further, the check valve 44 is provided on an upper surface of the flange portion 15f. The check valve 44 is a so-called return valve that allows the hydraulic oil to flow from upstream to downstream but not from downstream to upstream.

Figure 9:
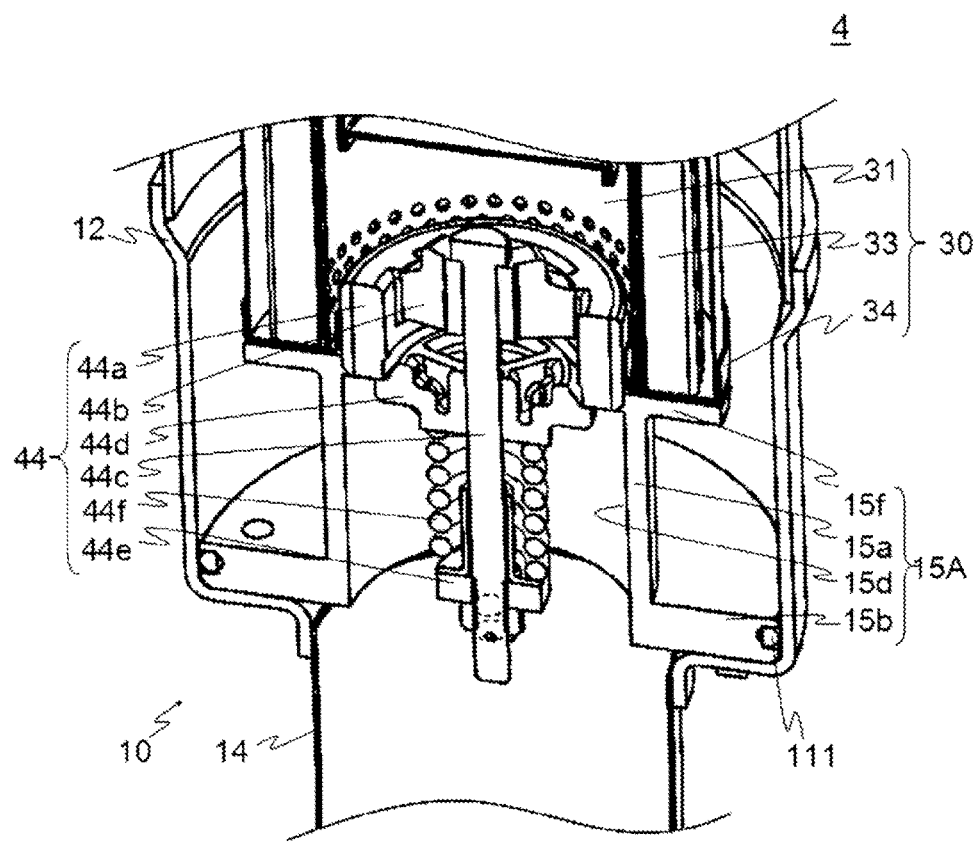
FIG. 9 is a cross-sectional perspective view illustrating an overview of the return filter 4, with an area surrounding a check valve 44 enlarged.

FIG. 9 is a cross-sectional perspective view illustrating an overview of the return filter 4, with the area surrounding the check valve 44 enlarged (note that hatching indicating a cross section is omitted). The check valve 44 mainly includes an attaching portion 44a, an axis retaining portion 44b, an axis 44c, a plate 44d, an elastic member retaining portion 44e, and an elastic member 44f.

The attaching portion 44a is attached to the flange portion 15f. An outer peripheral surface of the attaching portion 44a is fitted with the through-hole 15d so as to prevent the liquid from leaking from the area between the attaching portion 44a and the through-hole 15d. The axis 44c is fixed to the attaching portion 44a via the axis retaining portion 44b. Further, the plate 44d is provided to a surface on a lower side of the attaching portion 44a.

The elastic member retaining portion 44e is provided near a lower end of the axis 44c. The elastic member 44f is a compression spring with a first end provided to the plate 44d and a second end provided to the elastic member retaining portion 44e. The elastic member 44f biases an upward force onto the plate 44d.

While the hydraulic apparatus is operating (in a normal state), the hydraulic oil flows inside the hydraulic circuit at a flow rate of about 0.01 to 0.1 l/minute. The hydraulic oil flows from the space S1 into the internal space S2 and, after filtration, passes through the check valve 44. At this flow rate, the plate 44d is pressed by a certain force (hereinafter referred to as the "force F1") by the hydraulic oil, thereby separating a lower end surface of the attaching portion 44a and an upper end surface of the plate 44d by a certain distance (hereinafter referred to as the "distance h1") and thus opening the check valve 44. As a result, the filtered hydraulic oil flows from the internal space S2 toward the tubular portion 14.

When the flow rate of the hydraulic oil that flows inside the hydraulic circuit increases to about 0.1 to 1 l/minute, the flow rate of the filtered hydraulic oil that flows downward from the internal space S2 also increases. Nevertheless, while the distance h1 between the lower end surface of the attaching portion 44a and the upper end surface of the plate 44d is sufficient when the flow rate is about 0.01 to 0.1 l/minute, the distance h1 is not sufficient when the flow rate is about 0.1 to 1 l/minute. Thus, when the flow rate is increased, the filtered hydraulic oil presses the plate 44d by a force F2 (force F2>force F1), causing the plate 44d to resist the biasing force of the elastic member 44f and move downward.

As a result, while the plate 44d moves downward until the distance between the lower end surface of the attaching portion 44a and the upper end surface of the plate 44d reaches a distance h2 (h2>h1), which is suitable for a flow rate of about 0.1 to 1 l/minute, a portion of the hydraulic oil is bounced back at the attaching portion 44a during this period and flows upward. With the check valve 44 thus impeding the flow of the hydraulic oil, the flow rate into the tubular portion 14 (the flow rate into the tank main body 101) can be reduced.

Once the flow rate of the hydraulic oil that flows into the hydraulic circuit returns to normal, the plate 44d moves upward to the distance h1 by the biasing force of the elastic member 44f. When the flow of the hydraulic oil inside the hydraulic circuit stops, the plate 44d moves upward by the biasing force of the elastic member 44f, the lower end surface of the attaching portion 44a and the upper end surface of the plate 44d come into contact, and the check valve 44 closes.

Thus, with usage of the check valve 44, a portion of the filtered hydraulic oil accumulates in the internal space S2 when the flow rate increases, making it possible to prevent the filtered hydraulic oil from flowing into the external space S3 all at once.

Embodiments of the invention have been described in detail with reference to the drawings; however, specific configurations are not limited to the embodiments, and changes in the design or the like are also included within a scope which does not depart from the gist of the invention. For example, the above examples have been explained in detail in order to facilitate understanding of the present invention and are not necessarily limited to examples provided with the entirety of the configuration described above. In addition, a part of the configuration of an embodiment may be replaced with the configuration of another embodiment and the configuration of another embodiment may be added to, deleted from, or replaced with the configuration of an embodiment.

Further, in the present invention, "substantially/approximately" is a concept that includes variation or modification to the extent that sameness is not lost, and does not only mean strictly the same. For example, "substantially orthogonal" is not limited to being strictly orthogonal, and is a concept that includes an error of several degrees, for example. Further, simple expressions such as orthogonal, parallel, and matching are not to be understood as merely being strictly orthogonal, parallel, matching, and the like, and include being substantially parallel, substantially orthogonal, substantially matching, and the like.

Furthermore, the meaning of the term "near" in the present invention includes a region of a range (which can be determined as desired) near a position serving as a reference. For example, "near the end" refers to a region of a range near the end, and is a concept indicating that the end may or may not be included.

REFERENCE SIGNS LIST 1, 2, 3, 4 Return filter
9 Suction strainer
10 Filter case
11 First case
12 Second case
12a Opening
12b Bottom surface
12c Opening
12d Side surface
13 Flange portion
13a Bolt insertion hole
13b Hole
14 Tubular portion
15, 15A Outflow pipe
15a Cylindrical portion
15b, 15c, 15f Flange portion
15d Through-hole
15e Front end portion
20 Lid member
20a Bolt hole
30 Filter element
31 Inner tube
32 Outer tube
33 Filtration material
34, 35 Plate
35a Plate-shaped portion
35b Opening
40 Cylindrical member
40a Hole
40b Flange portion
41, 43 Baffle plate
41a Blade member
41b Peripheral wall
42 Valve
42a Strainer
42b Moving member
42c Elastic member
43a Hole
44 Check valve
44a Attaching portion
44b Axis retaining portion
44c Axis
44d Plate
44e Elastic member retaining portion
44f Elastic member
50 External flow path
50a, 50b, 50c Opening
50d First portion
50e Second portion
50f Third portion
50g Linking portion
51 Air release valve
52 Case portion
52a Hole main body portion
52b First tapered hole portion
52c Second tapered hole portion 52d Groove
53 Float
61 Elastic member
91 Filtration material
92 Upper end support member
93 Lower end support member
93a Through-hole
100 Hydraulic oil tank
101 Tank main body
101a Upper surface
101b Hole
101c Lower surface
101d Outflow port
102 Attachment plate
102a Hole
110 Bolt
111 Sealing member

The invention claimed is:

1. A filter device, comprising:
a filter element comprising a filtration material having a substantially cylindrical shape;
a filter case having a bottomed substantially cylindrical shape and provided with the filter element in an interior thereof;
a lid member that covers an upper end of the filter case and comprises an external flow path that communicates a hollow portion of the filter element and an exterior of the filter case;
an inflow portion configured to cause a fluid to flow into a space between the filter case and the filter element;
an outflow portion that has a substantially tubular shape, communicates the hollow portion of the filter element to the exterior of the filter case, and is disposed on a lower side of the filter element; and
an impeding member that impedes a flow of the fluid and is disposed in a hollow portion of the filter element or the outflow portion,
wherein:
the impeding member comprises a plurality of blade members having a substantially fan-type plate shape in a planar view; and
the blade members form a spiral in a circumferential direction.

2. The filter device according to claim 1, wherein the lid member further comprises a second external flow path that communicates the space between the filter case and the filter element to the exterior of the filter case.

3. The filter device according to claim 1,
wherein the external flow path comprises a case portion, the case portion comprising:
a hole main body portion having a substantially columnar shape;
a first hole portion that is formed on an upper side of the hole main body portion and comprises a portion having a cross-sectional area of a cross section substantially orthogonal to a first direction along a center axis of the hole main body portion that is less than a cross-sectional area of a cross section substantially orthogonal to the first direction of the hole main body portion; and
a second hole portion that is formed on a lower side of the hole main body portion and has a cross-sectional area of a cross section substantially orthogonal to the first direction that is less than a cross-sectional area of a cross section substantially orthogonal to the first direction of the hole main body portion, and
wherein the filter device further comprises a float inserted into the case portion, the float being configured to be movable between a position that blocks the first hole portion and a position that blocks the second hole portion.

4. The filter device according to claim 2,
wherein the external flow path comprises a case portion, the case portion comprising:
a hole main body portion having a substantially columnar shape;
a first hole portion that is formed on an upper side of the hole main body portion and comprises a portion having a cross-sectional area of a cross section substantially orthogonal to a first direction along a center axis of the hole main body portion that is less than a cross-sectional area of a cross section substantially orthogonal to the first direction of the hole main body portion; and
a second hole portion that is formed on a lower side of the hole main body portion and has a cross-sectional area of a cross section substantially orthogonal to the first direction that is less than a cross-sectional area of a cross section substantially orthogonal to the first direction of the hole main body portion, and
wherein the filter device further comprises a float inserted into the case portion, the float being configured to be movable between a position that blocks the first hole portion and a position that blocks the second hole portion.

5. A filtration device, comprising:
a filter device that includes:
a filter element comprising a filtration material having a substantially cylindrical shape,
a filter case having a bottomed substantially cylindrical shape and provided with the filter element in an interior thereof,
a lid member that covers an upper end of the filter case and comprises an external flow path that communicates a hollow portion of the filter element and an exterior of the filter case,
an inflow portion configured to cause a fluid to flow into a space between the filter case and the filter element,
an outflow portion that has a substantially tubular shape, communicates the hollow portion of the filter element and the exterior of the filter case, and is disposed on a lower side of the filter element, and
an impeding member that impedes a flow of the fluid and is disposed in a hollow portion of the filter element or the outflow portion;
a tank disposed with the filter device in an interior thereof; and
a strainer disposed near a bottom surface of the tank,
wherein:
the filter device and the strainer are disposed in the interior of the tank with a lower side of the filter device in contact with an upper side of the strainer;
the impeding member comprises a plurality of blade members having a substantially fan-type plate shape in a planar view; and
the blade members form a spiral in a circumferential direction.

* * * * *